United States Patent
Araki et al.

(10) Patent No.: US 12,378,127 B2
(45) Date of Patent: Aug. 5, 2025

(54) SILICA SOL HAVING PARTICLE SIZE DISTRIBUTION AND PRODUCTION METHOD THEREFOR

(71) Applicant: NISSAN CHEMICAL CORPORATION, Tokyo (JP)

(72) Inventors: Megumi Araki, Sodegaura (JP);
Naohiko Suemura, Sodegaura (JP);
Takeshi Nakada, Sodegaura (JP);
Hikaru Onishi, Sodegaura (JP);
Masatoshi Sugisawa, Sodegaura (JP);
Jiahao Liu, Sodegaura (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 18/286,321

(22) PCT Filed: Jan. 13, 2023

(86) PCT No.: PCT/JP2023/000839
§ 371 (c)(1),
(2) Date: Oct. 10, 2023

(87) PCT Pub. No.: WO2023/136331
PCT Pub. Date: Jul. 20, 2023

(65) Prior Publication Data
US 2024/0270582 A1    Aug. 15, 2024

(30) Foreign Application Priority Data
Jan. 13, 2022 (JP) .................... 2022-003956

(51) Int. Cl.
*C01B 33/149* (2006.01)
(52) U.S. Cl.
CPC ........ *C01B 33/149* (2013.01); *C01P 2004/53* (2013.01); *C01P 2004/62* (2013.01); *C01P 2004/64* (2013.01); *C01P 2006/22* (2013.01)
(58) Field of Classification Search
CPC .............. C01B 33/149; C01P 2004/53; C01P 2004/62; C01P 2004/64; C01P 2006/22
See application file for complete search history.

(56) References Cited

U.S. PATENT DOCUMENTS

| | | |
|---|---|---|
| 2003/0054077 A1 | 3/2003 | Ishiwata et al. |
| 2003/0157804 A1 | 8/2003 | Puppe et al. |
| 2012/0309870 A1 | 12/2012 | Thunhorst et al. |
| 2016/0039682 A1* | 2/2016 | Zenitani ............... C01B 33/148 423/335 |
| 2021/0309834 A1* | 10/2021 | Kuroiwa ................. C09D 7/61 |
| 2022/0177318 A1 | 6/2022 | Otsuki et al. |

FOREIGN PATENT DOCUMENTS

| | | |
|---|---|---|
| EP | 2366737 A1 | 9/2011 |
| JP | H09-173045 A | 7/1997 |
| JP | 2007-51187 A | 3/2007 |
| JP | 2007-137972 A | 6/2007 |
| JP | 2008-169233 A | 7/2008 |
| JP | 2008-297183 A | 12/2008 |
| JP | 2013-519756 A | 5/2013 |
| JP | 2014-031397 A | 2/2014 |
| JP | 2014-043364 A | 3/2014 |
| JP | 2020-111474 A | 7/2020 |
| JP | 2021-109934 A | 8/2021 |
| WO | 2020/179555 A1 | 9/2020 |
| WO | 2020/230823 A1 | 11/2020 |

OTHER PUBLICATIONS

Jan. 3, 2024 Office Action issued in Korean Patent Application No. 10-2023-7035803.
Feb. 4, 2024 Office Action issued in Chinese Application No. 202380011130.2.
Jul. 10, 2023 Office Action issued in Japanese Application No. 2023-528171.
Mar. 20, 2023 Written Opinion in International Application No. PCT/JP2023/000839.
Mar. 20, 2023 International Search Report issued in PCT/JP2023/000839.
Jul. 12, 2024 Office Action issued in Korean Patent Application No. 10-2023-7035803.
Jun. 28, 2024 Extended European Search Report issued in EPC Patent Application 23740339.9.
Database WPIWeek200754 Thomson Scientific, London, GB; AN 2007-550847 and JP2007 137972A (JGC Catalysts & Chem Ltd) Jun. 7, 2007.
Database WPIWeek 2021068 Thomson Scientific, London, GB; AN2021-88485R- and JP 2021 109934 A (Shinetsu Chem Ind Co Ltd) Aug. 2, 2021.
Jul. 11, 2024 Extended European Search Report issued in EPC Patent Application 23740339.9.

* cited by examiner

*Primary Examiner* — Jiangtian Xu
(74) *Attorney, Agent, or Firm* — Oliff PLC

(57) ABSTRACT

A silica sol including silica particles exhibiting an average particle diameter distribution having at least two peaks, the silica sol being characterized in that the at least two peaks include the largest peak a, in a range of D50-D90, being present in a range of 35-200 nm, and the largest peak b, in a range of D10-D50, being present in a range from 5 nm to less than 35 nm, and that the surfaces of at least some of silica particles include an organic group bonded directly to a silicon atom via an Si—C bond, and an alkoxy group including a methoxy group or an ethoxy group, wherein the alkoxy group is bonded to the surface of the silica particles at a ratio of 0.6-3.0 alkoxy groups/nm$^2$.

20 Claims, No Drawings

SILICA SOL HAVING PARTICLE SIZE DISTRIBUTION AND PRODUCTION METHOD THEREFOR

TECHNICAL FIELD

The present invention relates to a silica sol having a particle size distribution, and a production method for the silica sol.

BACKGROUND ART

There has been known a silica sol having at least two peaks (maximum values of particle diameter distribution) in the range of a large average particle diameter and the range of a small average particle diameter in the particle diameter distribution.

For example, there has been disclosed a method for improving the yield of beer, the method using a silica sol containing colloidal particles exhibiting an average diameter distribution curve having two or more different peaks, and satisfying the following relations: $20\ \text{nm} \leq D_1 \leq 40\ \text{nm}$ and $150\ \text{nm} \leq D_2 \leq 600\ \text{nm}$, wherein $D_1$ and $D_2$ represent the particle diameters corresponding to the respective peaks (see Patent Document 1).

There has been disclosed a composition containing microparticles wherein (the volume of particles having a particle diameter equal to or less than the modal diameter on a volume basis)/(the volume of the remaining particles) is 1.0 or more (see Patent Document 2).

PRIOR ART DOCUMENTS

Patent Documents

Patent Document 1: JP H09173045 A
Patent Document 2: JP 2007-051187 A

SUMMARY OF THE INVENTION

Problems to be Solved by the Invention

The present invention provides a silica sol which undergoes a small change in viscosity during storage at room temperature or under heating and which is prepared by stably dispersing, in an organic solvent or a polymerizable monomer, silica particles whose surfaces are coated with a silane compound having a polymerizable functional group. The present invention also provides a production method for the silica sol.

Means for Solving the Problems

A first aspect of the present invention is a silica sol comprising silica particles exhibiting an average particle diameter distribution having at least two peaks, and a basic substance, characterized in that the at least two peaks include a peak a which is largest in a range of D50 to D90 and is present in a range of 35 nm or more and 200 nm or less, and a peak b which is largest in a range of D10 to D50 and is present in a range of 5 nm or more and less than 35 nm; the silica particles contain, in the surfaces of at least a portion thereof, an organic group directly bonded to a silicon atom via an Si—C bond and an alkoxy group consisting of a methoxy group or an ethoxy group; and the alkoxy group is bonded to the surfaces of the silica particles in an amount of 0.6 to 3.0/nm².

A second aspect of the present invention is the silica sol according to the first aspect, wherein silica particles A present in the range of the peak a, silica particles B present in the range of the peak b, or both these particles are coated with a silane compound.

A third aspect of the present invention is the silica sol according to the first or second aspect, wherein at least a portion of the silica particles is coated with a silane compound having an organic group directly bonded to a silicon atom, and the silane compound having an organic group directly bonded to a silicon atom is at least one silane compound selected from the group consisting of silane compounds of the following Formulae (1) to (3):

$$R^1_a Si(R^2)_{4-a} \quad \text{Formula (1)}$$

$$[R^3{}_b Si(R^4)_{3-b}]_2 Y_c \quad \text{Formula (2)}$$

$$R^5_d Si(R^6)_{4-d} \quad \text{Formula (3)}$$

(in Formula (1), $R^1$ is a group bonded to the silicon atom via an Si—C bond and is each an alkyl group, a halogenated alkyl group, an alkenyl group, an aryl group, or an organic group containing an epoxy group, a (meth)acryloyl group, a mercapto group, an amino group, a ureido group, or a cyano group; $R^2$ is a group or atom bonded to the silicon atom and is each an alkoxy group, an acyloxy group, or a halogen atom; and a is an integer of 1 to 3, and in Formulae (2) and (3), each of $R^3$ and $R^5$ is a group bonded to the silicon atom via an Si—C bond and is a $C_{1-3}$ alkyl group or a $C_{6-30}$ aryl group; each of $R^4$ and $R^6$ is a group or atom bonded to the silicon atom and is an alkoxy group, an acyloxy group, or a halogen atom; Y is a group or atom bonded to the silicon atom and is an alkylene group, an NH group, or an oxygen atom; b is an integer of 1 to 3; c is an integer of 0 or 1; and d is an integer of 1 to 3).

A fourth aspect of the present invention is the silica sol according to the second or third aspect, wherein the silica particles A, the silica particles B, or both these particles are coated with a silane compound having a radical polymerizable or cationic polymerizable functional group.

A fifth aspect of the present invention is the silica sol according to the fourth aspect, wherein the polymerizable functional group of the silane compound having the polymerizable functional group is a (meth)acryloyl group, an epoxy group, an organic group containing an epoxy group, or a nitrogen-atom-containing organic group containing an epoxy group.

A sixth aspect of the present invention is the silica sol according to any one of the first to fifth aspects, wherein the viscosity of the silica sol having a silica concentration of 60% by mass as measured after storage at 50° C. for 14 days is 1.0 to 30 times the viscosity of only a dispersion medium used in the silica sol as measured at 25° C.

A seventh aspect of the present invention is the silica sol according to any one of the first to sixth aspects, wherein the dispersion medium of the silica sol is an organic solvent having a carbonyl structure, an ether structure, or a carbon-carbon bond structure.

An eighth aspect of the present invention is the silica sol according to any one of the first to sixth aspects, wherein the dispersion medium of the silica sol is a ketone, an ester, an ether, an amide, or a hydrocarbon.

A ninth aspect of the present invention is the silica sol according to any one of the first to sixth aspects, wherein the dispersion medium of the silica sol is methyl ethyl ketone, methyl isobutyl ketone, diisopropyl ketone, diisobutyl ketone, cyclohexanone, ethyl acetate, butyl acetate, propylene glycol monomethyl ether, or propylene glycol monomethyl ether acetate.

A tenth aspect of the present invention is the silica sol according to any one of the first to sixth aspects, wherein the dispersion medium of the silica sol is a polymerizable monomer having a polymerizable group.

An eleventh aspect of the present invention is the silica sol according to the tenth aspect, wherein the polymerizable group of the polymerizable monomer is a (meth)acryloyl group, an epoxy group, an organic group containing an epoxy group, or a nitrogen-atom-containing organic group containing an epoxy group.

A twelfth aspect of the present invention is the silica sol according to any one of the third to eleventh aspects, wherein the silane compound coating the silica particles and the dispersion medium of the silica sol have a combination of functional groups copolymerizable with each other.

A thirteenth aspect of the present invention is the silica sol according to any one of the first to twelfth aspects, wherein the basic substance is selected from an amine, ammonia, an inorganic alkaline compound, or a quaternary ammonium compound.

A fourteenth aspect of the present invention is a production method for the silica sol according to any one of the first to thirteenth aspects, the method comprising the following step (A):

step (A): a step of mixing a silica sol A containing silica particles A having an average particle diameter of 35 nm or more and 200 nm or less with a silica sol B containing silica particles B having an average particle diameter of 5 nm or more and less than 35 nm so that the mass ratio of the silica particles A: the silica particles B is 99:1 to 60:40.

A fifteenth aspect of the present invention is the production method for the silica sol according to the fourteenth aspect, wherein the silica sol A and the silica sol B in the step (A) contain the same dispersion medium or dispersion media compatible with each other, and the dispersion medium is water, a $C_{1-4}$ alcohol, an organic solvent having a carbonyl structure, an ether structure, or a carbon-carbon bond structure, or a polymerizable monomer having a polymerizable group.

A sixteenth aspect of the present invention is the production method for the silica sol according to the fourteenth aspect, wherein, in the step (A), the dispersion medium of the silica sol A and the silica sol B is changed from water to a $C_{1-4}$ alcohol, and then the dispersion medium is changed to an organic solvent having a carbonyl structure, an ether structure, or a carbon-carbon bond structure, or to a polymerizable monomer having a polymerizable group.

A seventeenth aspect of the present invention is the production method for the silica sol according to the fourteenth aspect, wherein when the dispersion medium of the silica sol A and the silica sol B is a $C_{1-4}$ alcohol in the step (A), the method comprises a step of coating the silica particles of the silica sol A and/or the silica sol B with at least one silane compound selected from the group consisting of silane compounds of the following Formulae (1) to (3):

Formula (1)

Formula (2)

Formula (3)

(in Formula (1), $R^1$ is a group bonded to the silicon atom via an Si—C bond and is each an alkyl group, a halogenated alkyl group, an alkenyl group, an aryl group, or an organic group containing an epoxy group, a (meth)acryloyl group, a mercapto group, an amino group, a ureido group, or a cyano group; $R^2$ is a group or atom bonded to the silicon atom and is each an alkoxy group, an acyloxy group, or a halogen atom; and a is an integer of 1 to 3, and in Formulae (2) and (3), each of $R^3$ and $R^5$ is a group bonded to the silicon atom via an Si—C bond and is a $C_{1-3}$ alkyl group or a $C_{6-30}$ aryl group; each of $R^4$ and $R^6$ is a group or atom bonded to the silicon atom and is an alkoxy group, an acyloxy group, or a halogen atom; Y is a group or atom bonded to the silicon atom and is an alkylene group, an NH group, or an oxygen atom; b is an integer of 1 to 3; c is an integer of 0 or 1; and d is an integer of 1 to 3).

An eighteenth aspect of the present invention is the production method for the silica sol according to the fourteenth aspect, wherein when the dispersion medium of the silica sol A and the silica sol B is a $C_{1-4}$ alcohol in the step (A), the method comprises a step of adding a basic substance.

Effects of the Invention

Since the silica sol of the present invention contains silica particles having a large particle diameter and silica particles having a small particle diameter, the silica sol is a dispersion that achieves high packing property in the dispersion medium, and enables an increase in silica concentration. When the silica sol of the present invention is cured on a substrate, the cured coating film exhibits high packing property of the silica particles, and thus exhibits excellent coating properties.

The silica sol of the present invention is a dispersion wherein the silica particles exhibit high dispersion stability in the dispersion medium, since the silica particles repel one another due to electrical repulsion between the particle surfaces.

In general, an increase in silica particle concentration tends to cause aggregation of silica particles due to bonding between silanol groups on the silica particle surfaces. In contrast, in the present invention, the silanol groups on the surfaces of the silica particles are partially coated with a hydrophilic low-molecular-weight alkoxy group (consisting of a methoxy group or an ethoxy group) and with a partially hydrophobic organic group directly bonded to a silicon atom via an Si—C bond, to thereby prevent aggregation of the silica particles due to bonding between the silanol groups. Thus, the silica sol of the present invention can prevent aggregation.

In the silica sol of the present invention, the aforementioned alkoxy groups (consisting of a methoxy group or an ethoxy group) are bonded to the silica particles in an amount of 0.6 to 3.0/nm². The aforementioned low-molecular-weight alkoxy group (e.g., a methoxy group or an ethoxy group) has moderate hydrophilicity, whereas the organic group bonded to a silicon atom via an Si—C bond exhibits high compatibility not only with an organic solvent, but also with a dispersion medium composed of monomer molecules. Since the silica particles retain (the organic group) and (the alkoxy group) on the surfaces thereof during the process wherein the dispersion medium of the aqueous silica sol is changed to the aforementioned dispersion medium through solvent replacement, the resultant silica sol can exhibit high dispersibility in any dispersion medium even when the silica sol contains the silica particles at a high concentration.

The organosilica sol of the present invention having high dispersibility can maintain its high dispersibility even when the dispersion medium is changed to a polymerizable monomer.

MODES FOR CARRYING OUT THE INVENTION

The present invention is directed to a silica sol containing a basic substance and silica particles exhibiting an average particle diameter distribution having at least two peaks, characterized in that the at least two peaks include a peak a which is largest in a range of D50 to D90 and is present in a range of 35 nm or more and 200 nm or less, and a peak b which is largest in a range of D10 to D50 and is present in a range of 5 nm or more and less than 35 nm; the silica particles contain, in the surfaces of at least a portion thereof, an organic group directly bonded to a silicon atom via an Si—C bond and an alkoxy group consisting of a methoxy group or an ethoxy group; and alkoxy groups are bonded to the surfaces of the silica particles in an amount of 0.6 to 3.0/nm$^2$.

The aforementioned D10, D50, and D90 refer to particle diameters corresponding to cumulative 10%, 50%, and 90% from the microparticle side in the cumulative particle size distribution. In the present invention, the value of the cumulative particle size distribution can be measured by using, for example, the particle size distribution obtained through image analysis. In the measurement of particle size distribution through image analysis, a measurement sample is analyzed as a transmission electron microscope image. The D values are analyzed by the number distribution method or the volume distribution method. In the number distribution method, particles are regarded as perfect circles having the same area as that of the particles, and the percentage (%) of particles having a specific particle diameter is measured in a certain visual field. In the volume distribution method, the amount (% by mass) of particles having a specific particle diameter is measured in a certain amount of sample under the assumption that volume and weight of particles are in a proportional relationship when the density of the particles is constant. In the present invention, the D values (D10, D50, and D90) are preferably determined by the volume distribution method.

The silica sol of the present invention contains silica particles having at least two peaks in an average particle diameter distribution. Regarding the at least two peaks, the expression "the largest peak a in a range of D50 to D90 is present in a range of 35 nm or more and 200 nm or less" refers to that the largest peak is present in a range of D50 to D90 of the cumulative particle size distribution, and the expression "the largest peak b in a range of D10 to D50 is present in a range of 5 nm or more and less than 35 nm" refers to that the largest peak is present in a range of D10 to D50 of the cumulative particle size distribution. In the present invention, the height (appearance frequency) of either of the peak a and the peak b may be higher. As shown in the below-described production method, the silica sol of the present invention can be produced by mixing a silica sol A containing silica particles A corresponding to the peak a (present in the peak a range) with a silica sol B containing silica particles B corresponding to the peak b (present in the peak b range) so that the mass ratio of the silica particles A: the silica particles B is preferably 99:1 to 60:40. Thus, the peak a may be higher than the peak b.

In the present invention, at least a portion of the aforementioned silica particles may be coated with a silane compound having an organic group directly bonded to a silicon atom. The coating process may be performed on only the silica particles A, only the silica particles B, or both the silica particles A and the silica particles B.

The aforementioned silane compound used for the coating may be selected from the group consisting of silane compounds of the aforementioned Formulae (1) to (3). Such a silane compound may be bonded to the silica particles by dehydration condensation between a hydrolysate of the compound and silanol groups of the silica particles.

The expression "coated with a silane compound" as used herein refers to a mode wherein the surface of a silica particle is coated with a silane compound, and includes any mode wherein a silane compound is bonded to the surface of a silica particle.

The "mode wherein the surface of a silica particle is coated with a silane compound" may be a mode wherein the silane compound covers at least a portion of the surface of the silica particle, and thus encompasses a mode wherein the silane compound covers a portion of the surface of the silica particle, and a mode wherein the silane compound covers the entire surface of the silica particle. In these modes, it does not matter whether or not the silane compound is bonded to the surface of the silica particle.

The "mode wherein a silane compound is bonded to the surface of a silica particle" may be a mode wherein the silane compound is bonded to at least a portion of the surface of the silica particle, and thus encompasses, for example, a mode wherein the silane compound is bonded to a portion of the surface of the silica particle, a mode wherein the silane compound is bonded to a portion of the surface of the silica particle and covers at least a portion of the surface, and a mode wherein the silane compound is bonded to the entire surface of the silica particle so as to cover the entire surface.

In Formula (1), $R^1$ is a group bonded to the silicon atom via an Si—C bond and is each an alkyl group, a halogenated alkyl group, an alkenyl group, an aryl group, or an organic group containing an epoxy group, a (meth)acryloyl group, a mercapto group, an amino group, a ureido group, or a cyano group; $R^2$ is a group or atom bonded to the silicon atom and is each an alkoxy group, an acyloxy group, or a halogen atom; and a is an integer of 1 to 3.

In Formulae (2) and (3), each of $R^3$ and $R^5$ is a group bonded to the silicon atom via an Si—C bond and is a $C_{1-3}$ alkyl group or a $C_{6-30}$ aryl group; each of $R^4$ and $R^6$ is a group or atom bonded to the silicon atom and is an alkoxy group, an acyloxy group, or a halogen atom; Y is a group or atom bonded to the silicon atom and is an alkylene group, an NH group, or an oxygen atom; b is an integer of 1 to 3; c is an integer of 0 or 1; and d is an integer of 1 to 3.

The aforementioned alkyl group is a $C_{1-18}$ alkyl group, and may have a linear, branched, or cyclic structure. Examples of the alkyl group include, but are not limited to, methyl group, ethyl group, n-propyl group, i-propyl group, cyclopropyl group, n-butyl group, i-butyl group, s-butyl group, t-butyl group, cyclobutyl group, 1-methyl-cyclopropyl group, 2-methyl-cyclopropyl group, n-pentyl group, 1-methyl-n-butyl group, 2-methyl-n-butyl group, 3-methyln-butyl group, 1,1-dimethyl-n-propyl group, 1,2-dimethyl-n-propyl group, 2,2-dimethyl-n-propyl group, 1-ethyl-n-propyl group, cyclopentyl group, 1-methyl-cyclobutyl group, 2-methyl-cyclobutyl group, 3-methyl-cyclobutyl group, 1,2-dimethyl-cyclopropyl group, 2,3-dimethyl-cyclopropyl group, 1-ethyl-cyclopropyl group, 2-ethyl-cyclopropyl group, n-hexyl group, 1-methyl-n-pentyl group, 2-methyl-n-pentyl group, 3-methyl-n-pentyl group, 4-methyl-n-pentyl group, 1,1-dimethyl-n-butyl group, 1,2-dimethyl-n-butyl group, 1,3-dimethyl-n-butyl group, 2,2-dimethyl-n-butyl group, 2,3-dimethyl-n-butyl group, 3,3-dimethyl-n-butyl group, 1-ethyl-n-butyl group, 2-ethyl-n-butyl group, 1,1,2-trimethyl-n-propyl group, 1,2,2-trimethyl-n-propyl group, 1-ethyl-1-methyl-n-propyl group, 1-ethyl-2-methyl-n-propyl group, cyclohexyl group, 1-methyl-cyclopentyl group, 2-methyl-cyclopentyl group, 3-methyl-cyclopentyl group, 1-ethyl-cyclobutyl group, 2-ethyl-cyclobutyl group, 3-ethyl-cyclobutyl group, 1,2-dimethyl-cyclobutyl group, 1,3-dimethyl-cyclobutyl group, 2,2-dimethyl-cyclobutyl group, 2,3-dimethyl-cyclobutyl group, 2,4-dimethyl-cyclobutyl group, 3,3-dimethyl-cyclobutyl group, 1-n-propyl-cyclopropyl group, 2-n-propyl-cyclopropyl group, 1-i-propyl-cyclopropyl group, 2-i-propyl-cyclopropyl group, 1,2,2-trimethyl-cyclopropyl group, 1,2,3-trimethyl-cyclopropyl group, 2,2,3-trimethyl-cyclopropyl group, 1-ethyl-2-methyl-cyclopropyl group, 2-ethyl-1-methyl-cyclopropyl group, 2-ethyl-2-methyl-cyclopropyl group, 2-ethyl-3-methyl-cyclopropyl group, hexyl group, heptyl group, octyl group, nonyl group, decyl group, undecyl group, dodecyl group, tridecyl group, tetradecyl group, pentadecyl group, hexadecyl group, heptadecyl group, and octadecyl group.

The aforementioned alkylene group is a divalent group derived by removal of one hydrogen atom from the aforementioned alkyl group, and may be a linear, branched, or cyclic alkylene group.

The aforementioned aryl group is a $C_{6-30}$ aryl group. Examples of the aryl group include, but are not limited to, phenyl group, naphthyl group, anthracene group, and pyrene group.

Examples of the aforementioned alkenyl group include, but are not limited to, $C_{2-10}$ alkenyl groups, such as ethenyl group, 1-propenyl group, 2-propenyl group, 1-methyl-1-ethenyl group, 1-butenyl group, 2-butenyl group, 3-butenyl group, 2-methyl-1-propenyl group, 2-methyl-2-propenyl group, 1-ethylethenyl group, 1-methyl-1-propenyl group, 1-methyl-2-propenyl group, 1-pentenyl group, 2-pentenyl group, 3-pentenyl group, 4-pentenyl group, 1-n-propylethenyl group, 1-methyl-1-butenyl group, 1-methyl-2-butenyl group, 1-methyl-3-butenyl group, 2-ethyl-2-propenyl group, 2-methyl-1-butenyl group, 2-methyl-2-butenyl group, 2-methyl-3-butenyl group, 3-methyl-1-butenyl group, 3-methyl-2-butenyl group, 3-methyl-3-butenyl group, 1,1-dimethyl-2-propenyl group, 1-i-propylethenyl group, 1,2-dimethyl-1-propenyl group, 1,2-dimethyl-2-propenyl group, 1-cyclopentenyl group, 2-cyclopentenyl group, 3-cyclopentenyl group, 1-hexenyl group, 2-hexenyl group, 3-hexenyl group, 4-hexenyl group, 5-hexenyl group, 1-methyl-1-pentenyl group, 1-methyl-2-pentenyl group, 1-methyl-3-pentenyl group, 1-methyl-4-pentenyl group, 1-n-butylethenyl group, 2-methyl-1-pentenyl group, and 2-methyl-2-pentenyl group.

Examples of the aforementioned alkoxy group include, but are not limited to, $C_{1-10}$ alkoxy groups, such as methoxy group, ethoxy group, n-propoxy group, i-propoxy group, n-butoxy group, i-butoxy group, s-butoxy group, t-butoxy group, n-pentyloxy group, 1-methyl-n-butoxy group, 2-methyl-n-butoxy group, 3-methyl-n-butoxy group, 1,1-dimethyl-n-propoxy group, 1,2-dimethyl-n-propoxy group, 2,2-dimethyl-n-propoxy group, 1-ethyl-n-propoxy group, and n-hexyloxy group.

Examples of the aforementioned acyloxy group include, but are not limited to, $C_{2-10}$ acyloxy groups, such as methylcarbonyloxy group, ethylcarbonyloxy group, n-propylcarbonyloxy group, i-propylcarbonyloxy group, n-butylcarbonyloxy group, i-butylcarbonyloxy group, s-butylcarbonyloxy group, t-butylcarbonyloxy group, n-pentylcarbonyloxy group, 1-methyl-n-butylcarbonyloxy group, 2-methyl-n-butylcarbonyloxy group, 3-methyl-n-butylcarbonyloxy group, 1,1-dimethyl-n-propylcarbonyloxy group, 1,2-dimethyl-n-propylcarbonyloxy group, 2,2-dimethyl-n-propylcarbonyloxy group, 1-ethyl-n-propylcarbonyloxy group, n-hexylcarbonyloxy group, 1-methyl-n-pentylcarbonyloxy group, and 2-methyl-n-pentylcarbonyloxy group.

Examples of the aforementioned halogen atom include fluorine atom, chlorine atom, bromine atom, and iodine atom.

Examples of the aforementioned epoxy group-containing organic group include 2-(3,4-epoxycyclohexyl)ethyl group and 3-glycidoxypropyl group.

The aforementioned (meth)acryloyl group refers to both an acryloyl group and a methacryloyl group. Examples of the (meth)acryloyl group-containing organic group include 3-methacryloxypropyl group and 3-acryloxypropyl group.

Examples of the mercapto group-containing organic group include 3-mercaptopropyl group.

Examples of the amino group-containing organic group include 2-aminoethyl group, 3-aminopropyl group, N-2-(aminoethyl)-3-aminopropyl group, N-(1,3-dimethyl-butylidene)aminopropyl group, N-phenyl-3-aminopropyl group, and N-(vinylbenzyl)-2-aminoethyl-3-aminopropyl group.

Examples of the ureido group-containing organic group include 3-ureidopropyl group.

Examples of the cyano group-containing organic group include 3-cyanopropyl group.

The compound of each of Formulae (2) and (3) is preferably a compound capable of forming a trimethylsilyl group on the surfaces of silica particles.

Examples of such a compound include those of the following Formulae.

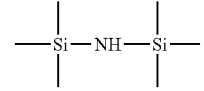

Formula (2-1)

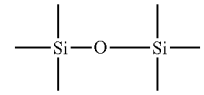

Formula (2-2)

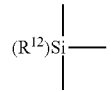

Formula (2-3)

In the aforementioned Formulae, $R^{12}$ is an alkoxy group, such as a methoxy group or an ethoxy group.

The aforementioned silane compound may be a silane compound available from Shin-Etsu Chemical Co., Ltd.

The coating of at least a portion of the aforementioned silica particles with a silane compound having an organic group directly bonded to a silicon atom corresponds to a step of reacting (dehydration condensation) of the hydroxyl group on the surfaces of silica particles (e.g., silanol group of silica particles) with the aforementioned silane compound (hydrolysate of the silane compound), to thereby coat the surfaces of silica particles with the silane compound via a siloxane bond. The reaction may be performed at a temperature falling within a range of 20° C. to the boiling point of the dispersion medium, for example, at a temperature falling within a range of 20° C. to 100° C. The reaction may be performed for about 0.1 to 6 hours.

The surfaces of silica particles may be coated with the aforementioned silane compound by adding the silane compound to the silica sol in such an amount that the number of silicon atoms in the silane compound corresponds to a coating amount of $0.6/nm^2$ to $5.0/nm^2$.

The hydrolysis of the aforementioned silane compound requires water. In the case of an aqueous solvent sol, the aqueous solvent is used as "water" for the hydrolysis. When the aqueous medium is replaced with an organic solvent containing methanol or ethanol, water remaining in the solvent may be used as "water" for the hydrolysis. For example, water present in the reaction system in an amount of 0.01 to 1% by mass may be used for the hydrolysis. The hydrolysis may be performed with or without use of a catalyst.

The hydrolysis is performed without use of a catalyst when the surfaces of silica particles are present on an acidic side.

When a catalyst is used for the hydrolysis, the hydrolysis catalyst may be a metal chelate compound, an organic acid, an inorganic acid, an organic base, or an inorganic base. Examples of the metal chelate compound serving as a hydrolysis catalyst include triethoxy·mono(acetylacetonato)titanium and triethoxy·mono(acetylacetonato)zirconium. Examples of the organic acid serving as a hydrolysis catalyst include acetic acid and oxalic acid. Examples of the inorganic acid serving as a hydrolysis catalyst include hydrochloric acid, nitric acid, sulfuric acid, hydrofluoric acid, and phosphoric acid. Examples of the organic base serving as a hydrolysis catalyst include pyridine, pyrrole, piperazine, and quaternary ammonium salt. Examples of the inorganic base serving as a hydrolysis catalyst include ammonia, sodium hydroxide, and potassium hydroxide.

The silica particles A, the silica particles B, or both these particles may be coated with a silane compound having a radical polymerizable or cationic polymerizable functional group.

The aforementioned polymerizable functional group may be a (meth)acryloyl group, an epoxy group, an organic group containing an epoxy group, or a nitrogen-atom-containing organic group containing an epoxy group.

The silica sol of the present invention may have a solid content of 0.1 to 70% by mass, or 1 to 60% by mass, or 10 to 60% by mass. The "solid content" as used herein refers to all components (except for the solvent component) contained in the silica sol.

The silica sol of the present invention exhibits high stability. For example, the viscosity of the silica sol of the present invention having a silica concentration of 60% by mass as measured after storage at 50° C. for 14 days can be maintained in a range of, for example, 1.0 to 30 times the viscosity of only the dispersion medium used in the silica sol as measured at 25° C.

The silica sol of the present invention can be produced by a production method including the following step (A):
step (A): a step of mixing a silica sol A containing silica particles A having an average particle diameter of 35 nm or more and 200 nm or less with a silica sol B containing silica particles B having an average particle diameter of 5 nm or more and less than 35 nm so that the mass ratio of the silica particles A: the silica particles B is 99:1 to 60:40.

The silica sol A and the silica sol B in the step (A) contain the same dispersion medium or dispersion media compatible with each other, and the dispersion medium may be water, a $C_{1-4}$ alcohol, an organic solvent having a carbonyl structure, an ether structure, or a carbon-carbon bond structure, or a polymerizable monomer having a polymerizable group.

Examples of the aforementioned $C_{1-4}$ alcohol include methanol, ethanol, n-propanol, i-propanol, butanol, and propylene glycol monomethyl ether.

Examples of the organic solvent having a carbonyl structure include a ketone, an ester, an aldehyde, or an amide.

Examples of the aforementioned ketone include linear or cyclic aliphatic ketones having a carbon atom number of 3 to 30, such as methyl ethyl ketone, diethyl ketone, methyl propyl ketone, methyl isobutyl ketone, diisopropyl ketone, diisobutyl ketone, methyl amyl ketone, and cyclohexanone.

Examples of the aforementioned ether include linear or cyclic aliphatic ethers having a carbon atom number of 3 to 30, such as diethyl ether and tetrahydrofuran.

Examples of the aforementioned ester include linear or cyclic esters having a carbon atom number of 2 to 30, such as ethyl acetate, butyl acetate (e.g., n-butyl acetate, sec-butyl acetate), methoxybutyl acetate, amyl acetate, n-propyl acetate, isopropyl acetate, ethyl lactate, butyl lactate, ethylene glycol monomethyl ether acetate, propylene glycol monomethyl ether acetate, propylene glycol monoethyl ether acetate, propylene glycol monopropyl ether acetate, phenyl acetate, phenyl lactate, and phenyl propionate.

Examples of the aforementioned amide include $C_{3-30}$ aliphatic amides, such as dimethylacetamide, dimethylformamide, N-methyl-2-pyrrolidone, and N-ethyl-2-pyrrolidone.

The aforementioned organic solvent having a carbon-carbon bond structure is a hydrocarbon, for example, a linear or cyclic aliphatic or aromatic hydrocarbon having a carbon atom number of 6 to 30. Specific examples of the hydrocarbon include hexane, heptane, octane, nonane, decane, benzene, toluene, and xylene.

Among the above-exemplified dispersion media, particularly used are methyl ethyl ketone, methyl isobutyl ketone, diisopropyl ketone, diisobutyl ketone, cyclohexanone, ethyl acetate, butyl acetate, propylene glycol monomethyl ether, and propylene glycol monomethyl ether acetate.

The dispersion medium of the silica sol may be a polymerizable monomer having a polymerizable group.

The aforementioned polymerizable monomer used is preferably a liquid polymerizable monomer having at least one polymerizable group in the molecule, wherein the polymerizable group is a (meth)acryloyl group, an epoxy group, an organic group containing an epoxy group, or a nitrogen-atom-containing organic group containing an epoxy group. The aforementioned polymerizable monomer is a monofunctional monomer or a multifunctional (e.g., bifunctional or trifunctional) monomer.

In the step (A), preferably, the dispersion medium of the silica sol A and the silica sol B is changed from water to a $C_{1-4}$ alcohol, and then the dispersion medium is changed to an organic solvent having a carbonyl structure, an ether structure, or a carbon-carbon bond structure, or to a polymerizable monomer having a polymerizable group.

When the dispersion medium of the silica sol A and the silica sol B is a $C_{1-4}$ alcohol in the step (A), the production method preferably includes a step of coating the silica particles of the silica sol A and/or the silica sol B with at least one silane compound selected from the group consisting of silane compounds of the aforementioned Formulae (1) to (3).

When the dispersion medium of the silica sol A and the silica sol B is a $C_{1-4}$ alcohol in the step (A), a basic substance may be added. The addition of the basic substance is preferably performed after the aforementioned step of coating the silica particles with a silane compound.

The aforementioned basic substance is preferably added in such an amount that the pH of the silica sol is adjusted to 4.0 to 10.0. The added basic substance is present in the silica sol in an amount corresponding to the added amount. The pH of the silica sol of the present invention corresponds to the measured pH of a liquid prepared by mixing the silica sol, methanol, and pure water in proportions by mass of 1:1:1 or 1:2:1.

Examples of the aforementioned basic substance include an amine, ammonia, an inorganic alkaline compound, and a quaternary ammonium compound.

The aforementioned amine may be, for example, a secondary amine or tertiary amine having a total carbon atom number of 5 to 35.

Examples of the aforementioned secondary amine include ethyl-n-propylamine, ethylisopropylamine, dipropylamine, diisopropylamine, ethylbutylamine, n-propylbutylamine, dibutylamine, ethylpentylamine, n-propylpentylamine, isopropylpentylamine, dipentylamine, ethyloctylamine, isopropyloctylamine, butyloctylamine, and dioctylamine.

Examples of the aforementioned tertiary amine include triethylamine, ethyl-di-n-propylamine, diethyl-n-propylamine, tri-n-propylamine, triisopropylamine, ethyldibutylamine, diethylbutylamine, isopropyldibutylamine, diisopropylethylamine, diisopropylbutylamine, tributylamine, ethyldipentylamine, diethylpentylamine, tripentylamine, methyldioctylamine, dimethyloctylamine, ethyldioctylamine, diethyloctylamine, trioctylamine, benzyldibutylamine, and diazabicycloundecene.

Among the above-exemplified amines, preferred are secondary amines and tertiary amines having an alkyl group having a total carbon atom number of 6 to 35, such as diisopropylamine, tripentylamine, triisopropylamine, dimethyloctylamine, and trioctylamine.

The aforementioned quaternary ammonium compound is, for example, a quaternary ammonium hydroxide.

The quaternary ammonium hydroxide is preferably a tetraalkylammonium hydroxide having a total carbon atom number of 4 to 40. Examples of the tetraalkylammonium hydroxide include tetramethylammonium hydroxide, tetraethylammonium hydroxide, tetra-n-propylammonium hydroxide, tetra-i-propylammonium hydroxide, tetrabutylammonium hydroxide, and ethyltrimethylammonium hydroxide.

Examples of the aforementioned inorganic alkaline compound include an alkali metal hydroxide salt, an alkali metal alkoxide, an aliphatic carboxylic acid alkali metal salt, and an aromatic carboxylic acid alkali metal salt.

Examples of the alkali metal hydroxide salt include sodium hydroxide, potassium hydroxide, sodium carbonate, and potassium carbonate.

Examples of the alkali metal alkoxide include sodium methoxide, sodium ethoxide, potassium methoxide, and potassium ethoxide.

Examples of the aliphatic carboxylic acid alkali metal salt include a saturated aliphatic carboxylic acid alkali metal salt having a carbon atom number of 2 to 30, and an unsaturated aliphatic carboxylic acid alkali metal salt having a carbon atom number of 2 to 30. Examples of the alkali metal include sodium and potassium. Examples of the saturated aliphatic carboxylic acid alkali metal salt include lauric acid alkali metal salts, myristic acid alkali metal salts, palmitic acid alkali metal salts, and stearic acid alkali metal salts. Examples of the unsaturated aliphatic carboxylic acid alkali metal salt include oleic acid alkali metal salts, linoleic acid alkali metal salts, and linolenic acid alkali metal salts. In particular, an unsaturated aliphatic carboxylic acid alkali metal salt such as potassium oleate is preferably used.

Examples of the aromatic carboxylic acid alkali metal salt include the aforementioned alkali metal salts of benzoic acid, salicylic acid, and phthalic acid.

In the present invention, the functional group of the silane compound coating silica particles is a polymerizable group (polymerizable functional group), and the polymerizable group may be a (meth)acryloyl group, an epoxy group, an organic group containing an epoxy group, or a nitrogen-atom-containing organic group containing an epoxy group.

Regarding the silica particles and dispersion medium forming the silica sol of the present invention, the silane compound coating the silica particles and the dispersion medium of the silica sol may have a combination of functional groups copolymerizable with each other. Thus, the silica-particle-coating silane compound having a (meth)acryloyl group, an epoxy group, an organic group containing an epoxy group, or a nitrogen-atom-containing organic group containing an epoxy group may be used in combination with the compound (serving as the dispersion medium of the silica sol) having a (meth)acryloyl group, an epoxy group, an organic group containing an epoxy group, or a nitrogen-atom-containing organic group containing an epoxy group.

The silica sol of the present invention may be a silica sol produced by dispersing the aforementioned silica particles in at least one hydrophobic organic solvent selected from the group consisting of ketones, ethers, esters, amides, and hydrocarbons. Alternatively, the silica sol of the present invention may be a silica sol produced by dispersing the aforementioned silica particles in a polymerizable monomer.

The silica sol of the present invention can be produced into a polymerizable composition by using a polymerizable monomer as the dispersion medium. Also, the silica sol of the present invention can be produced into a varnish by mixing the silica sol with a thermosetting or photocurable resin.

The silica sol of the present invention may contain a curing agent such as an amine-based curing agent, an acid anhydride-based curing agent, or an acid generator-based curing agent (thermal acid generator or photoacid generator), and may be produced into a cured product. A varnish containing the silica sol of the present invention, a curable resin, and a curing agent may be applied or charged to a substrate, followed by heating, photoirradiation, or a combination thereof, to thereby form a cured product. The aforementioned curable resin is, for example, a resin having such a functional group as a (meth)acryloyl group, an epoxy group, an organic group containing an epoxy group, or a nitrogen-atom-containing organic group containing an epoxy group.

The aforementioned silica sol of the present invention can be used for various applications, including an adhesive, a release agent, a semiconductor encapsulant, an LED encapsulant, a paint, a film additive, a hard coating agent, a photoresist material, a printing ink, a cleaning agent, a cleaner, an additive for various resins, an insulating composition, an antirust agent, a lubricating oil, a metal working oil, a coating agent for film, and a peeling agent.

EXAMPLES

The present invention will next be described in more detail with reference to Examples and Comparative Examples. However, the present invention should not be construed as being limited to the following Examples.
[Measurement of Silica (SiO$_2$) Concentration]

A silica sol was placed in a crucible and dried (solvent removal) at 130° C., and then baked at 1,000° C. for 30 minutes. The silica concentration was calculated by weighing the baked residue.
[Measurement of Average Primary Particle Diameter (Particle Diameter by Nitrogen Adsorption Method)]

The average primary particle diameter of silica particles in a silica sol was calculated from the specific surface area ($S_{N2}$) of the silica particles as measured by the nitrogen adsorption method.

A silica sol was dried at 300° C., and the resultant powder was used as a measurement sample. The specific surface area ($S_{N2}$) of the sample was measured with a specific surface area measuring apparatus MONOSORB (registered trademark) MS-16 (available from Yuasa Ionics). The resultant specific surface area $S_{N2}$ (m$^2$/g) was converted into spherical particles by use of the following formula, to thereby calculate the average primary particle diameter.

$$\text{Average primary particle diameter (nm)} = 2720/S_{N2}(\text{m}^2/\text{g})$$

[Measurement of Largest Peak a in Range of D50 to D90 and Largest Peak b in Range of D10 to D50]

Images of a silica sol were taken in 10 visual fields at a magnification of 100,000 with a transmission electron microscope (JEM-1010, available from JEOL Ltd.). The particle diameter of each of all the silica particles included in the resultant images was measured, and the particle diameter distribution (volume distribution) of the silica sol was calculated from the resultant data. The resultant particle diameter distribution curve was used to determine the particle diameter a corresponding to the largest peak in a range of D50 to D90, and the particle diameter b corresponding to the largest peak in a range of D10 to D50.
[Measurement of Viscosity]

The viscosity of an organic solvent-dispersed silica sol was measured with an Ostwald viscometer. The viscosity of a resin monomer-dispersed sol was measured with a B-type rotational viscometer (available from Toki Sangyo Co., Ltd.).
[Analysis Method for Amount of Alkoxy Group Bonded to Particle Surface]

4 mL of methyl ethyl ketone was added to 4 mL of a silica sol, and then 20 mL of n-hexane was added to the mixture, followed by centrifugation (centrifugal force: 2,770 G). Thereafter, the supernatant was discarded, and the resultant precipitate was separated. Subsequently, 2 to 4 mL of acetone was added to the precipitate to thereby redissolve the precipitate in acetone, and then n-hexane was added to the solution until aggregation occurred. Thereafter, an operation of separating the precipitate by centrifugation (centrifugal force: 2,770 G) was performed twice, and the resultant precipitate was dried under vacuum at 150° C., to thereby prepare dry powder.

In the case of a polymerizable monomer-dispersed silica sol, 20 mL of toluene was added to 3 g of the polymerizable monomer-dispersed silica sol to thereby dissolve the silica sol in toluene, followed by centrifugation (centrifugal force: 44,280 G). Thereafter, the supernatant was discarded, and the resultant precipitate was separated. Subsequently, 2 mL of acetone was added to the precipitate to thereby redissolve the precipitate in acetone, and then 12 mL of toluene was added to the solution. Thereafter, an operation of separating the precipitate by centrifugation (centrifugal force: 44,280 G) was performed twice, and the resultant precipitate was dried under vacuum at 150° C., to thereby prepare dry powder.

0.2 g of the above-prepared dry powder was mixed with 10 mL of 0.05 N aqueous sodium hydroxide solution, followed by dispersion with an ultrasonic cleaner (40 kHz) for 20 minutes. Thereafter, the resultant dispersion was allowed to stand at room temperature for one day, and then the solution portion was subjected to gas chromatography analysis, to thereby determine the number of alkoxy groups bonded to the silica surface per unit area (groups/nm$^2$).
[Measurement of pH]

pH (1+1): The pH of a liquid prepared by mixing a silica sol and pure water in proportions by mass of 1:1 was measured with a pH meter.

pH (1+1+1): The pH of a liquid prepared by mixing a silica sol, methanol, and pure water in proportions by mass of 1:1:1 was measured with a pH meter.
[Measurement of Amount of Organic Solvent Contained in Sol]

The amount of an organic solvent contained in a sol was measured by gas chromatography.

Example 1

Water-dispersed silica sol 1 (average primary particle diameter: 85 nm, pH 3, silica concentration: 34.5% by mass, available from Nissan Chemical Corporation) and water-dispersed silica sol 2 (average primary particle diameter: 12 nm, pH 3, silica concentration: 33% by mass, available from Nissan Chemical Corporation) were provided.

800 g of the water-dispersed silica sol 1 and 93 g of the water-dispersed silica sol 2 were added to a glass-made reactor (inner volume: 2 L) equipped with a stirrer, a condenser, a thermometer, and two inlet ports. While the sol in the reactor was maintained in a boiling state, methanol vapor generated in a separate boiler was continuously blown into the silica sol in the reactor, to thereby replace water with methanol. The replacement was terminated when the volume of the distillate reached 9 L, to thereby prepare 870 g of methanol-dispersed silica sol 1. The resultant methanol-dispersed silica sol 1 was found to have an SiO$_2$ concentration of 35.0% by mass, a water content of 1.6% by mass, and a pH (1+1) of 3.

A 2 L eggplant-shaped flask was charged with 800 g of the methanol-dispersed silica sol 1. While the sol was stirred with a magnetic stirrer, 14.2 g of phenyltrimethoxysilane (trade name KBM-103, available from Shin-Etsu Chemical Co., Ltd.) (3 per unit area (nm$^2$) of silica particle surface) was added to the sol, and then the liquid temperature was maintained at 60° C. for three hours. Subsequently, tri-n-pentylamine was added to the silica sol, to thereby adjust the pH (1+1+1) of the silica sol to 7.8. Thereafter, while methyl ethyl ketone was supplied, the silica sol was subjected to distillation with a rotary evaporator at a bath temperature of 80° C. under a reduced pressure of 500 to 350 Torr, to thereby prepare methyl ethyl ketone-dispersed silica sol 1

(SiO$_2$ concentration: 30.5% by mass, viscosity (20° C.): 1 mPa·s, water content: 0.1% by mass, methanol content: 0.1% by mass, largest peak a in a range of D50 to D90: 115 nm, largest peak b in a range of D10 to D50: 13 nm, pH (1+1+1): 7.8, organic group directly bonded to a silicon atom via an Si—C bond at the surfaces of silica particles: phenyl group, methoxy groups bonded to the surfaces of silica particles: 1.5/nm$^2$).

To 400 g of the methyl ethyl ketone-dispersed silica sol 1 was added 77 g of a mixed monomer of bisphenol A epoxy resin and bisphenol F epoxy resin (trade name EXA-830LVP, available from DIC Corporation, B-type viscosity at 25° C.: 1,500 mPa·s) serving as a polymerizable monomer. Thereafter, the solvent was removed at a bath temperature of 100° C. and at 200 to 30 Torr, to thereby prepare a silica sol dispersed in the mixed resin monomer of bisphenol A epoxy resin and bisphenol F epoxy resin. The resultant mixed resin monomer-dispersed silica sol was found to have an SiO$_2$ concentration of 60.0% by mass, a methanol content of less than 0.1% by mass, a methyl ethyl ketone content of less than 0.1% by mass, a B-type viscosity at 25° C. of 27,000 mPa·s, a viscosity after storage at 50° C. for 14 days of 31,000 mPa·s, and a viscosity after storage at 50° C. for 28 days of 33,000 mPa·s (methoxy groups bonded to the surfaces of silica particles: 1.2/nm$^2$). The viscosity of the mixed resin monomer-dispersed silica sol of Example 1 (silica concentration: 60% by mass) as measured after storage at 50° C. for 14 days was 21 times the viscosity of only the dispersion medium (the mixed resin monomer of bisphenol A epoxy resin and bisphenol F epoxy resin) as measured at 25° C.; i.e., the silica sol of Example 1 exhibited low viscosity and good stability.

Example 2

Methanol-dispersed silica sol 2 (SiO$_2$ concentration: 35.0% by mass, water content: 1.6% by mass, pH (1+1): 3) was prepared in the same manner as in Example 1, except that the amount of the water-dispersed silica sol 2 added was changed to 209 g.

The methanol-dispersed silica sol 2 was used, and addition of phenyltrimethoxysilane (addition amount: 3 per unit area (nm$^2$) of silica particle surface) and thermal reaction, and subsequent pH adjustment with tri-n-pentylamine were performed, and the solvent was replaced with methyl ethyl ketone in the same manner as in Example 1, to thereby prepare methyl ethyl ketone-dispersed silica sol 2 (SiO$_2$ concentration: 30.5% by mass, viscosity (20° C.): 1 mPa·s, water content: 0.1% by mass, methanol content: 0.1% by mass, largest peak a in a range of D50 to D90: 113 nm, largest peak b in a range of D10 to D50: 15 nm, pH (1+1+1): 7.4, organic group directly bonded to a silicon atom via an Si—C bond at the surfaces of silica particles: phenyl group, methoxy groups bonded to the surfaces of silica particles: 1.7/nm$^2$).

The methyl ethyl ketone-dispersed silica sol 2 was used, and the same operation as in Example 1 was performed, to thereby prepare a silica sol dispersed in a mixed resin monomer of bisphenol A epoxy resin and bisphenol F epoxy resin. The resultant mixed resin monomer-dispersed silica sol was found to have an SiO$_2$ concentration of 60.0% by mass, a methanol content of less than 0.1% by mass, a methyl ethyl ketone content of less than 0.1% by mass, a B-type viscosity at 25° C. of 25,000 mPa·s, a viscosity after storage at 50° C. for 14 days of 32,000 mPa·s, and a viscosity after storage at 50° C. for 28 days of 40,000 mPa·s. The viscosity of the mixed resin monomer-dispersed silica sol of Example 2 (silica concentration: 60% by mass) as measured after storage at 50° C. for 14 days was 21 times the viscosity of only the dispersion medium (the mixed resin monomer of bisphenol A epoxy resin and bisphenol F epoxy resin) as measured at 25° C.; i.e., the silica sol of Example 2 exhibited low viscosity and good stability.

Example 3

Methanol-dispersed silica sol 3 (SiO$_2$ concentration: 35.0% by mass, water content: 1.6% by mass, pH (1+1): 3) was prepared in the same manner as in Example 1, except that the amount of the water-dispersed silica sol 2 added was changed to 44 g.

The methanol-dispersed silica sol 3 was used, and addition of phenyltrimethoxysilane (addition amount: 3 per unit area (nm$^2$) of silica particle surface) and thermal reaction, and subsequent pH adjustment with tri-n-pentylamine were performed, and the solvent was replaced with methyl ethyl ketone in the same manner as in Example 1, to thereby prepare methyl ethyl ketone-dispersed silica sol 3 (SiO$_2$ concentration: 30.5% by mass, viscosity (20° C.): 1 mPa·s, water content: 0.1% by mass, methanol content: 0.1% by mass, largest peak a in a range of D50 to D90: 111 nm, largest peak b in a range of D10 to D50: 16 nm, pH (1+1+1): 7.9, organic group directly bonded to a silicon atom via an Si—C bond at the surfaces of silica particles: phenyl group, methoxy groups bonded to the surfaces of silica particles: 1.2/nm$^2$).

The methyl ethyl ketone-dispersed silica sol 3 was used, and the same operation as in Example 1 was performed, to thereby prepare a silica sol dispersed in a mixed resin monomer of bisphenol A epoxy resin and bisphenol F epoxy resin. The resultant mixed resin monomer-dispersed silica sol was found to have an SiO$_2$ concentration of 60.0% by mass, a methanol content of less than 0.1% by mass, a methyl ethyl ketone content of less than 0.1% by mass, a B-type viscosity at 25° C. of 32,000 mPas, a viscosity after storage at 50° C. for 14 days of 35,000 mPa·s, and a viscosity after storage at 50° C. for 28 days of 38,000 mPa·s (methoxy groups bonded to the surfaces of silica particles: 1.0/nm$^2$). The viscosity of the mixed resin monomer-dispersed silica sol of Example 3 (silica concentration: 60% by mass) as measured after storage at 50° C. for 14 days was 23 times the viscosity of only the dispersion medium (the mixed resin monomer of bisphenol A epoxy resin and bisphenol F epoxy resin) as measured at 25° C.; i.e., the silica sol of Example 3 exhibited low viscosity and good stability.

Example 4

Water-dispersed silica sol 3 (average primary particle diameter: 22 nm, pH 3, silica concentration: 40.5% by mass, available from Nissan Chemical Corporation) was provided.

Methanol-dispersed silica sol 4 (SiO$_2$ concentration: 35.0% by mass, water content: 1.6% by mass, pH (1+1): 3) was prepared in the same manner as in Example 1, except that 76 g of the water-dispersed silica sol 3 was added in place of the water-dispersed silica sol 2.

The methanol-dispersed silica sol 4 was used, and addition of phenyltrimethoxysilane (addition amount: 4 per unit area (nm$^2$) of silica particle surface) and thermal reaction, and subsequent pH adjustment with tri-n-pentylamine were performed, and the solvent was replaced with methyl ethyl ketone, to thereby prepare methyl ethyl ketone-dispersed silica sol 4 (SiO$_2$ concentration: 30.5% by mass, viscosity (20° C.): 1 mPa·s, water content: 0.1% by mass, methanol content: 0.1% by mass, largest peak a in a range of D50 to D90: 113 nm, largest peak b in a range of D10 to D50: 31 nm, pH (1+1+1): 7.8, organic group directly bonded to a silicon atom via an Si—C bond at the surfaces of silica particles: phenyl group, methoxy groups bonded to the surfaces of silica particles: 1.7/nm$^2$).

The methyl ethyl ketone-dispersed silica sol 4 was used, and the same operation as in Example 1 was performed, to thereby prepare a silica sol dispersed in a mixed resin monomer of bisphenol A epoxy resin and bisphenol F epoxy resin. The resultant mixed resin monomer-dispersed silica sol was found to have an SiO$_2$ concentration of 60.0% by mass, a methanol content of less than 0.1% by mass, a methyl ethyl ketone content of less than 0.1% by mass, a B-type viscosity at 25° C. of 35,000 mPa·s, a viscosity after storage at 50° C. for 14 days of 36,000 mPa·s, and a viscosity after storage at 50° C. for 28 days of 38,000 mPa·s (methoxy groups bonded to the surfaces of silica particles: 0.8/nm$^2$). The viscosity of the mixed resin monomer-dispersed silica sol of Example 4 (silica concentration: 60% by mass) as measured after storage at 50° C. for 14 days was 24 times the viscosity of only the dispersion medium (the mixed resin monomer of bisphenol A epoxy resin and bisphenol F epoxy resin) as measured at 25° C.; i.e., the silica sol of Example 4 exhibited low viscosity and good stability.

Example 5

Tri-n-pentylamine was added to 800 g of the methanol-dispersed silica sol 1 prepared in Example 1, to thereby adjust the pH (1+1+1) to 7.0. Subsequently, 5.9 g of 2-(3,4-epoxycyclohexyl)ethyltrimethoxysilane (KBM-303, available from Shin-Etsu Chemical Co., Ltd.) (1 per unit area (nm$^2$) of silica particle surface) was added to the mixture, and the resultant mixture was heated at 60° C. for two hours. Thereafter, 14.2 g of phenyltrimethoxysilane (3 per unit area (nm$^2$) of silica particle surface) was added to the mixture, and the resultant mixture was heated at 60° C. for two hours. Subsequently, the solvent was replaced with methyl ethyl ketone, to thereby prepare methyl ethyl ketone-dispersed silica sol 8 (SiO$_2$ concentration: 30.5% by mass, viscosity (20° C.): 1 mPa·s, water content: 0.1% by mass, methanol content: 0.1% by mass, largest peak a in a range of D50 to D90: 115 nm, largest peak b in a range of D10 to D50: 13 nm, pH (1+1+1): 7.4, organic groups directly bonded to a silicon atom via an Si—C bond at the surfaces of silica particles: 2-(3,4-epoxycyclohexyl)ethyl group and phenyl group, methoxy groups bonded to the surfaces of silica particles: 1.7/nm$^2$).

To 400 g of the methyl ethyl ketone-dispersed silica sol 8 were added 54 g of trade name TEPIC-VL (available from Nissan Chemical Corporation, component: tris-(4,5-epoxypentyl)-isocyanurate) and 23 g of trade name TEPIC-FL (available from Nissan Chemical Corporation, component: tris-(7,8-epoxyoctyl)-isocyanurate), which are nitrogen-atom-containing trifunctional epoxy resin monomers serving as polymerizable monomers, and then the solvent was removed at a bath temperature of 100° C. and at 200 to 30 Torr, to thereby prepare a silica sol dispersed in the nitrogen-atom-containing trifunctional epoxy resin monomer mixture. The silica sol dispersed in the nitrogen-atom-containing trifunctional epoxy resin monomer mixture was found to have an SiO$_2$ concentration of 60.0% by mass, a methanol content of less than 0.1% by mass, a methyl ethyl ketone content of less than 0.1% by mass, a B-type viscosity at 25° C. of 34,000 mPa·s, a viscosity after storage at 50° C. for 14 days of 35,000 mPa·s, and a viscosity after storage at 50° C. for 28 days of 35,000 mPa·s. The resin monomer mixture of 54 g of TEPIC-VL and 23 g of TEPIC-FL exhibited a B-type viscosity of 3,660 mPa·s at 25° C. Thus, the viscosity of the silica sol dispersed in the nitrogen-atom-containing trifunctional epoxy resin monomer mixture of Example 5 (silica concentration: 60% by mass) as measured after storage at 50° C. for 14 days was 10 times the viscosity of only the dispersion medium (the mixture of TEPIC-VL and TEPIC-FL, which are nitrogen-atom-containing trifunctional epoxy resin monomers) as measured at 25° C.; i.e., the silica sol of Example 5 exhibited low viscosity and good stability.

Example 6

Water-dispersed silica sol 4 (average primary particle diameter: 45 nm, pH 3, silica concentration: 20.5% by mass, available from Nissan Chemical Corporation) was provided.

Methanol-dispersed silica sol 7 (SiO$_2$ concentration: 35.0% by mass, water content: 1.6% by mass, pH (1+1): 3) was prepared in the same manner as in Example 1, except that 800 g of the water-dispersed silica sol 1 was replaced with 1,346 g of the water-dispersed silica sol 4. Thereafter, the methanol-dispersed silica sol 7 was used, and pH adjustment with tri-n-pentylamine and addition of 2-(3,4-epoxycyclohexyl)ethyltrimethoxysilane (addition amount: 1 per unit area (nm$^2$) of silica particle surface) and phenyltrimethoxysilane (addition amount: 3 per unit area (nm$^2$) of silica particle surface) and thermal reaction were performed in the same manner as in Example 5. Thereafter, the solvent was replaced with methyl ethyl ketone, to thereby prepare methyl ethyl ketone-dispersed silica sol 9 (SiO$_2$ concentration: 30.5% by mass, viscosity (20° C.): 1 mPa·s, water content: 0.1% by mass, methanol content: 0.1% by mass, largest peak a in a range of D50 to D90: 56 nm, largest peak b in a range of D10 to D50: 15 nm, pH (1+1+1): 7.1, organic groups directly bonded to a silicon atom via an Si—C bond at the surfaces of silica particles: 2-(3,4-epoxycyclohexyl)ethyl group and phenyl group, methoxy groups bonded to the surfaces of silica particles: 1.8/nm$^2$).

The methyl ethyl ketone-dispersed silica sol 9 was used, and the same operation as in Example 5 was performed, to thereby prepare a silica sol dispersed in a nitrogen-atom-containing trifunctional epoxy resin monomer mixture. The silica sol dispersed in the nitrogen-atom-containing trifunctional epoxy resin monomer mixture was found to have an SiO$_2$ concentration of 60.0% by mass, a methanol content of less than 0.1% by mass, a methyl ethyl ketone content of less than 0.1% by mass, a B-type viscosity at 25° C. of 64,000 mPa·s, a viscosity after storage at 50° C. for 14 days of 68,000 mPa·s, and a viscosity after storage at 50° C. for 28 days of 72,000 mPa·s. The viscosity of the silica sol dispersed in the nitrogen-atom-containing trifunctional epoxy resin monomer mixture of Example 6 (silica concentration: 60% by mass) as measured after storage at 50° C. for 14 days was 19 times the viscosity of only the dispersion medium (the mixture of TEPIC-VL and TEPIC-FL, which are nitrogen-atom-containing trifunctional epoxy resin monomers) as measured at 25° C.; i.e., the silica sol of Example 6 exhibited low viscosity and good stability.

Example 7

A 2 L eggplant-shaped flask was charged with 800 g of the methanol-dispersed silica sol 1. While the sol was stirred with a magnetic stirrer, 17.8 g of 3-methacryloxypropyltrimethoxysilane (trade name KBM-503, available from Shin-Etsu Chemical Co., Ltd.) (3 per unit area (nm$^2$) of silica particle surface) was added to the sol, and then the liquid temperature was maintained at 60° C. for three hours. Subsequently, tri-n-pentylamine was added to the silica sol to adjust the pH (1+1+1) of the silica sol to 9.1, to thereby prepare methanol-dispersed silica sol 8 (SiO$_2$ concentration: 35% by mass, viscosity (20° C.): 1 mPa·s, water content: 1.6% by mass, methanol content: 0.1% by mass, largest peak a in a range of D50 to D90: 115 nm, largest peak b in a range of D10 to D50: 13 nm, pH (1+1+1): 9.1, organic group directly bonded to a silicon atom via an Si—C bond at the surfaces of silica particles: methacryloxypropyl group, methoxy groups bonded to the surfaces of silica particles: 1.4/nm$^2$).

To 400 g of the methanol-dispersed silica sol 8 were added 43.1 g of trade name X-850-1066 (available from ESSTECH) and 43.1 g of trade name Light Ester 3EG (available from Kyoeisha Chemical Co., Ltd.), which are methacrylate monomers, and then the solvent was removed at a bath temperature of 60° C. and at 200 to 30 Torr, to thereby prepare a silica sol dispersed in a methacrylate monomer mixture. The methacrylate monomer mixture of 50 g of X-850-1066 and 50 g of Light Ester 3EG exhibited a B-type viscosity of 87 mPas at 25° C. The silica sol dispersed in the methacrylate monomer mixture was found to have an SiO$_2$ concentration of 60.0% by mass, a methanol content of less than 0.1% by mass, a B-type viscosity at 25° C. of 1,870 mPa·s, a viscosity after storage at 50° C. for 14 days of 1,900 mPa·s, and a viscosity after storage at 50° C. for 28 days of 1,920 mPa·s; i.e., the silica sol exhibited low viscosity and good stability. The viscosity of the silica sol dispersed in the methacrylate monomer mixture of Example 7 (silica concentration: 60% by mass) as measured after storage at 50° C. for 14 days was 22 times the viscosity of only the dispersion medium (the mixture of X-850-1066 and Light Ester 3EG, which are methacrylate monomers) as measured at 25° C.; i.e., the silica sol of Example 7 exhibited low viscosity and good stability.

Trade name X-850-1066 (available from ESSTECH) was a mixture of compounds having the following structures.

Example 8

The methyl ethyl ketone-dispersed silica sol 8 prepared in Example 5 was used, and the same operation as in Example 1 was performed, to thereby prepare a silica sol dispersed in a mixed resin monomer of bisphenol A epoxy resin and bisphenol F epoxy resin. The resultant mixed resin monomer-dispersed silica sol was found to have an SiO$_2$ concentration of 60.0% by mass, a methanol content of less than 0.1% by mass, a methyl ethyl ketone content of less than 0.1% by mass, a B-type viscosity at 25° C. of 20,000 mPa·s, a viscosity after storage at 50° C. for 14 days of 21,000 mPa·s, and a viscosity after storage at 50° C. for 28 days of 22,000 mPa·s (methoxy groups bonded to the surfaces of silica particles: 1.6/nm$^2$). The viscosity of the mixed resin monomer-dispersed silica sol of Example 8 (silica concentration: 60% by mass) as measured after storage at 50° C. for 14 days was 14 times the viscosity of only the dispersion medium (the mixed resin monomer of bisphenol A epoxy resin and bisphenol F epoxy resin) as measured at 25° C.; i.e., the silica sol of Example 8 exhibited low viscosity and good stability.

Comparative Example 1

The same operation as in Example 1 was performed, except that tri-n-pentylamine was not added, to thereby prepare methyl ethyl ketone-dispersed silica sol 5 (SiO$_2$ concentration: 30.5% by mass, viscosity (20° C.): 1 mPa·s, water content: 0.1% by mass, methanol content: 0.1% by mass, largest peak a in a range of D50 to D90: 113 nm, largest peak b in a range of D10 to D50: 15 nm, pH (1+1+1): 3.5, organic group directly bonded to a silicon atom via an Si—C bond at the surfaces of silica particles: phenyl group, methoxy groups bonded to the surfaces of silica particles: 0.8/nm$^2$).

The methyl ethyl ketone-dispersed silica sol 5 was used, and the same operation as in Example 1 was performed, to thereby prepare a silica sol dispersed in a mixed resin monomer of bisphenol A epoxy resin and bisphenol F epoxy resin. The resultant mixed resin monomer-dispersed silica

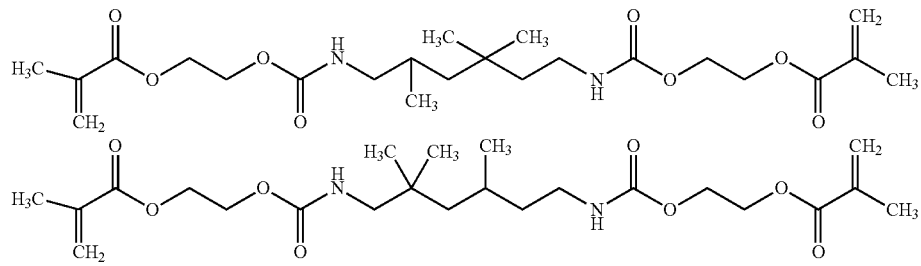

Trade name Light Ester 3EG (available from Kyoeisha Chemical Co., Ltd.) was a compound having the following structure.

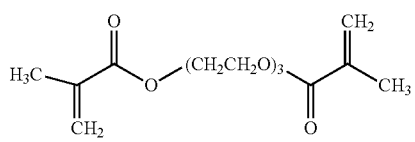

sol was found to have an SiO$_2$ concentration of 60.0% by mass, a methanol content of less than 0.1% by mass, a methyl ethyl ketone content of less than 0.1% by mass, and a B-type viscosity at 25° C. of 56,000 mPa·s. The viscosity after storage at 50° C. for 14 days was increased to 150,000 mPa·s, and the silica sol gelled after storage at 50° C. for 28 days. The viscosity of the mixed resin monomer-dispersed silica sol of Comparative Example 1 (silica concentration: 60% by mass) as measured after storage at 50° C. for 14 days was 100 times the viscosity of only the dispersion medium (the mixed resin monomer of bisphenol A epoxy resin and bisphenol F epoxy resin) as measured at 25° C.; i.e., the silica sol of Comparative Example 1 exhibited markedly increased viscosity and poor stability.

Comparative Example 2

The same operation as in Example 1 was performed, except that the water-dispersed silica sol 2 was not used, to thereby prepare methanol-dispersed silica sol 5 ($SiO_2$ concentration: 35.0% by mass, water content: 1.6% by mass, pH (1+1): 3).

The methanol-dispersed silica sol 5 was used, and addition of phenyltrimethoxysilane (addition amount: 3 per unit area ($nm^2$) of silica particle surface) and thermal reaction, and subsequent pH adjustment with tri-n-pentylamine were performed, and the solvent was replaced with methyl ethyl ketone in the same manner as in Example 1, to thereby prepare methyl ethyl ketone-dispersed silica sol 6 ($SiO_2$ concentration: 30.5% by mass, viscosity (20° C.): 1 mPa·s, water content: 0.1% by mass, methanol content: 0.1% by mass, largest peak a in a range of D50 to D90: 113 nm, peak b in a range of D10 to D50: none, pH (1+1+1): 7.6, organic group directly bonded to a silicon atom via an Si—C bond at the surfaces of silica particles: phenyl group, methoxy groups bonded to the surfaces of silica particles: 1.2/$nm^2$).

The methyl ethyl ketone-dispersed silica sol 6 was used, and the same operation as in Example 1 was performed, to thereby prepare a silica sol dispersed in a mixed resin monomer of bisphenol A epoxy resin and bisphenol F epoxy resin. The resultant mixed resin monomer-dispersed silica sol was found to have an $SiO_2$ concentration of 60.0% by mass, a methanol content of less than 0.1% by mass, a methyl ethyl ketone content of less than 0.1% by mass, a B-type viscosity at 25° C. of 71,000 mPa·s, a viscosity after storage at 50° C. for 14 days of 115,000 mPa·s, and a viscosity after storage at 50° C. for 28 days of 165,000 mPa·s. The viscosity at 25° C. was 30 times or more that of the mixed resin monomer serving as a dispersion medium. The viscosity of the mixed resin monomer-dispersed silica sol of Comparative Example 2 (silica concentration: 60% by mass) as measured after storage at 50° C. for 14 days was 77 times the viscosity of only the dispersion medium (the mixed resin monomer of bisphenol A epoxy resin and bisphenol F epoxy resin) as measured at 25° C.; i.e., the silica sol of Comparative Example 2 exhibited markedly increased viscosity and poor stability.

Comparative Example 3

The same operation as in Example 1 was performed, except that the replacement was terminated when the volume of the distillate reached 5 L, to thereby prepare methanol-dispersed silica sol 6 ($SiO_2$ concentration: 35.0% by mass, water content: 20% by mass, pH (1+1): 3).

The methanol-dispersed silica sol 6 was used, and addition of phenyltrimethoxysilane (addition amount: 3 per unit area ($nm^2$) of silica particle surface) and reaction, and subsequent pH adjustment with tri-n-pentylamine were performed, and the solvent was replaced with methyl ethyl ketone, to thereby prepare methyl ethyl ketone-dispersed silica sol 7 ($SiO_2$ concentration: 30.5% by mass, viscosity) (20° C.: 1 mPa·s, water content: 0.1% by mass, methanol content: 0.1% by mass, largest peak a in a range of D50 to D90: 114 nm, largest peak b in a range of D10 to D50: 15 nm, pH (1+1+1): 7.6, organic group directly bonded to a silicon atom via an Si—C bond at the surfaces of silica particles: phenyl group, methoxy groups bonded to the surfaces of silica particles: 0.5/$nm^2$).

The methyl ethyl ketone-dispersed silica sol 7 was used, and the same operation as in Example 1 was performed, to thereby prepare a silica sol dispersed in a mixed resin monomer of bisphenol A epoxy resin and bisphenol F epoxy resin. The resultant mixed resin monomer-dispersed silica sol was found to have an $SiO_2$ concentration of 60.0% by mass, a methanol content of less than 0.1% by mass, a methyl ethyl ketone content of less than 0.1% by mass, a B-type viscosity at 25° C. of 65,000 mPa·s, a viscosity after storage at 50° C. for 14 days of 89,000 mPa·s, and a viscosity after storage at 50° C. for 28 days of 120,000 mPa·s (methoxy groups bonded to the surfaces of silica particles: 0.3/$nm^2$). The viscosity of the mixed resin monomer-dispersed silica sol of Comparative Example 3 (silica concentration: 60% by mass) as measured after storage at 50° C. for 14 days was 59 times the viscosity of only the dispersion medium (the mixed resin monomer of bisphenol A epoxy resin and bisphenol F epoxy resin) as measured at 25° C.; i.e., the silica sol of Comparative Example 3 exhibited increased viscosity and poor stability.

Comparative Example 4

The methanol-dispersed silica sol 5 prepared in Comparative Example 2 was used, and pH adjustment with tri-n-pentylamine and addition of 2-(3,4-epoxycyclohexyl)ethyl-trimethoxysilane (addition amount: 1 per unit area ($nm^2$) of silica particle surface) and phenyltrimethoxysilane (addition amount: 3 per unit area ($nm^2$) of silica particle surface) and thermal reaction were performed in the same manner as in Example 5. Thereafter, the solvent was replaced with methyl ethyl ketone, to thereby prepare methyl ethyl ketone-dispersed silica sol 10 ($SiO_2$ concentration: 30.5% by mass, viscosity (20° C.): 1 mPas, water content: 0.1% by mass, methanol content: 0.1% by mass, largest peak a in a range of D50 to D90: 115 nm, peak b in a range of D10 to D50: none, pH (1+1+1): 7.4, organic groups directly bonded to a silicon atom via an Si—C bond at the surfaces of silica particles: 2-(3,4-epoxycyclohexyl)ethyl group and phenyl group, methoxy groups bonded to the surfaces of silica particles: 1.3/$nm^2$).

The methyl ethyl ketone-dispersed silica sol 10 was used, and the same operation as in Example 5 was performed, to thereby prepare a silica sol dispersed in a nitrogen-atom-containing trifunctional epoxy resin monomer mixture. The silica sol dispersed in the nitrogen-atom-containing trifunctional epoxy resin monomer mixture was found to have an $SiO_2$ concentration of 60.0% by mass, a methanol content of less than 0.1% by mass, a methyl ethyl ketone content of less than 0.1% by mass, a B-type viscosity at 25° C. of 175,000 mPa·s, a viscosity after storage at 50° C. for 14 days of 190,000 mPa·s, and a viscosity after storage at 50° C. for 28 days of 210,000 mPa·s. The viscosity of the silica sol dispersed in the nitrogen-atom-containing trifunctional epoxy resin monomer mixture of Comparative Example 4 (silica concentration: 60% by mass) as measured after storage at 50° C. for 14 days was 52 times the viscosity of only the dispersion medium (the mixture of TEPIC-VL and TEPIC-FL, which are nitrogen-atom-containing trifunctional epoxy resin monomers) as measured at 25° C.; i.e., the silica sol of Comparative Example 4 exhibited increased viscosity and poor stability.

Comparative Example 5

The same operation as in Example 6 was performed, except that the water-dispersed silica sol 2 was not used, to thereby prepare methanol-dispersed silica sol 8 (SiO$_2$ concentration: 35.0% by mass, water content: 1.6% by mass, pH (1+1): 3).

Subsequently, pH adjustment with tri-n-pentylamine and addition of 2-(3,4-epoxycyclohexyl)ethyltrimethoxysilane (addition amount: 1 per unit area (nm$^2$) of silica particle surface) and phenyltrimethoxysilane (addition amount: 3 per unit area (nm$^2$) of silica particle surface) and thermal reaction were performed in the same manner as in Example 5. Thereafter, the solvent was replaced with methyl ethyl ketone, to thereby prepare methyl ethyl ketone-dispersed silica sol 11 (SiO$_2$ concentration: 30.5% by mass, viscosity (20° C.): 1 mPa·s, water content: 0.1% by mass, methanol content: 0.1% by mass, largest peak a in a range of D50 to D90: 56 nm, peak b in a range of D10 to D50: none, pH (1+1+1): 7.6, organic groups directly bonded to a silicon atom via an Si—C bond at the surfaces of silica particles: 2-(3,4-epoxycyclohexyl)ethyl group and phenyl group, methoxy groups bonded to the surfaces of silica particles: 1.4/nm$^2$).

The methyl ethyl ketone-dispersed silica sol 11 was used, and the same operation as in Example 5 was performed, to thereby prepare a silica sol dispersed in a nitrogen-atom-containing trifunctional epoxy resin monomer mixture. The silica sol dispersed in the nitrogen-atom-containing trifunctional epoxy resin monomer mixture was found to have an SiO$_2$ concentration of 60.0% by mass, a methanol content of less than 0.1% by mass, a methyl ethyl ketone content of less than 0.1% by mass, a B-type viscosity at 25° C. of 210,000 mPa·s, a viscosity after storage at 50° C. for 14 days of 225,000 mPa·s, and a viscosity after storage at 50° C. for 28 days of 245,000 mPa·s. The viscosity of the silica sol dispersed in the nitrogen-atom-containing trifunctional epoxy resin monomer mixture of Comparative Example 5 (silica concentration: 60% by mass) as measured after storage at 50° C. for 14 days was 61 times the viscosity of only the dispersion medium (the mixture of TEPIC-VL and TEPIC-FL, which are nitrogen-atom-containing trifunctional epoxy resin monomers) as measured at 25° C.; i.e., the silica sol of Comparative Example 5 exhibited increased viscosity and poor stability.

Comparative Example 6

The same operation as in Example 5 was performed, except that the methanol-dispersed silica sol 1 was replaced with the methanol-dispersed silica sol 6, to thereby prepare methyl ethyl ketone-dispersed silica sol 12 (SiO$_2$ concentration: 30.5% by mass, viscosity (20° C.): 1 mPa·s, water content: 0.1% by mass, methanol content: 0.1% by mass, largest peak a in a range of D50 to D90: 113 nm, largest peak b in a range of D10 to D50: 14 nm, pH (1+1+1): 7.4, organic groups directly bonded to a silicon atom via an Si—C bond at the surfaces of silica particles: 2-(3,4-epoxycyclohexyl) ethyl group and phenyl group, methoxy groups bonded to the surfaces of silica particles: 0.4/nm$^2$).

The methyl ethyl ketone-dispersed silica sol 12 was used, and the same operation as in Example 5 was performed, to thereby prepare a silica sol dispersed in a nitrogen-atom-containing trifunctional epoxy resin monomer mixture. The silica sol dispersed in the nitrogen-atom-containing trifunctional epoxy resin monomer mixture was found to have an SiO$_2$ concentration of 60.0% by mass, a methanol content of less than 0.1% by mass, a methyl ethyl ketone content of less than 0.1% by mass, a B-type viscosity at 25° C. of 198,000 mPa·s, a viscosity after storage at 50° C. for 14 days of 230,000 mPa·s, and a viscosity after storage at 50° C. for 28 days of 280,000 mPa·s. The viscosity of the silica sol dispersed in the nitrogen-atom-containing trifunctional epoxy resin monomer mixture of Comparative Example 6 (silica concentration: 60% by mass) as measured after storage at 50° C. for 14 days was 63 times the viscosity of only the dispersion medium (the mixture of TEPIC-VL and TEPIC-FL, which are nitrogen-atom-containing trifunctional epoxy resin monomers) as measured at 25° C.; i.e., the silica sol of Comparative Example 6 exhibited increased viscosity and poor stability.

Comparative Example 7

The methanol-dispersed silica sol 5 prepared in Comparative Example 2 was used, and addition of 3-methacryloxypropyltrimethoxysilane (addition amount: 3 per unit area (nm$^2$) of silica particle surface) and thermal reaction, and subsequent pH adjustment by addition of tri-n-pentylamine were performed in the same manner as in Example 7, to thereby prepare methanol-dispersed silica sol 9 (SiO$_2$ concentration: 35% by mass, viscosity (20° C.): 1 mPa·s, water content: 1.6% by mass, methanol content: 0.1% by mass, largest peak a in a range of D50 to D90: 115 nm, peak b in a range of D10 to D50: none, pH (1+1+1): 9, organic group directly bonded to a silicon atom via an Si—C bond at the surfaces of silica particles: methacryloxypropyl group, methoxy groups bonded to the surfaces of silica particles: 1.2/nm$^2$).

To 400 g of the methanol-dispersed silica sol 9 were added 44.4 g of trade name X-850-1066 (available from ESSTECH) and 44.4 g of trade name Light Ester 3EG (available from Kyoeisha Chemical Co., Ltd.), which are methacrylate monomers, and then the solvent was removed at a bath temperature of 100° C. and at 200 to 30 Torr, to thereby prepare a silica sol dispersed in a methacrylate monomer mixture. The silica sol dispersed in the methacrylate monomer mixture was found to have an SiO$_2$ concentration of 60.0% by mass, a methanol content of less than 0.1% by mass, a B-type viscosity at 25° C. of 4,980 mPas, a viscosity after storage at 50° C. for 14 days of 5,400 mPa·s, and a viscosity after storage at 50° C. for 28 days of 6,000 mPa·s. The viscosity of the silica sol dispersed in the methacrylate monomer mixture of Comparative Example 7 (silica concentration: 60% by mass) as measured after storage at 50° C. for 14 days was 62 times the viscosity of only the dispersion medium (the mixture of X-850-1066 and Light Ester 3EG, which are methacrylate monomers) as measured at 25° C.; i.e., the silica sol of Comparative Example 7 exhibited increased viscosity.

INDUSTRIAL APPLICABILITY

The silica sol of the present invention undergoes a small change in viscosity during storage at room temperature or under heating, and the silica sol is prepared by stably dispersing, in an organic solvent or a polymerizable monomer, silica particles whose surfaces are coated with a silane compound.

The invention claimed is:

1. A silica sol comprising silica particles exhibiting an average particle diameter distribution having at least two peaks, and a basic substance, characterized in that:
the at least two peaks include a peak a which is largest in a range of D50 to D90 and is present in a range of 35 nm or more and 115 nm or less, and a peak b which is largest in a range of D10 to D50 and is present in a range of 5 nm or more and less than 35 nm;

the silica particles contain, in the surfaces of at least a portion thereof, an organic group directly bonded to a silicon atom via an Si—C bond and an alkoxy group consisting of a methoxy group or an ethoxy group; and the alkoxy group is bonded to the surfaces of the silica particles in an amount of 0.6 to $3.0/nm^2$, and wherein peak a is higher than peak b.

2. The silica sol according to claim 1, wherein silica particles A present in the range of the peak a, silica particles B present in the range of the peak b, or both these particles are coated with a silane compound.

3. The silica sol according to claim 1, wherein at least a portion of the silica particles is coated with a silane compound having an organic group directly bonded to a silicon atom, and the silane compound having an organic group directly bonded to a silicon atom is at least one silane compound selected from the group consisting of silane compounds of the following Formulae (1) to (3):

Formula (1)

Formula (2)

Formula (3)

(in Formula (1), $R^1$ is a group bonded to the silicon atom via an Si—C bond and is each an alkyl group, a halogenated alkyl group, an alkenyl group, an aryl group, or an organic group containing an epoxy group, a (meth)acryloyl group, a mercapto group, an amino group, a ureido group, or a cyano group;

$R^2$ is a group or atom bonded to the silicon atom and is each an alkoxy group, an acyloxy group, or a halogen atom; and a is an integer of 1 to 3, and in Formulae (2) and (3), each of $R^3$ and $R^5$ is a group bonded to the silicon atom via an Si—C bond and is a $C_{1-3}$ alkyl group or a $C_{6-30}$ aryl group;

each of $R^4$ and $R^6$ is a group or atom bonded to the silicon atom and is an alkoxy group, an acyloxy group, or a halogen atom;

Y is a group or atom bonded to the silicon atom and is an alkylene group, an NH group, or an oxygen atom;

b is an integer of 1 to 3; c is an integer of 0 or 1; and d is an integer of 1 to 3).

4. The silica sol according to claim 2, wherein the silica particles A, the silica particles B, or both these particles are coated with a silane compound having a radical polymerizable or cationic polymerizable functional group.

5. The silica sol according to claim 4, wherein the polymerizable functional group of the silane compound having the polymerizable functional group is a (meth)acryloyl group, an epoxy group, an organic group containing an epoxy group, or a nitrogen-atom-containing organic group containing an epoxy group.

6. The silica sol according to claim 1, wherein the viscosity of the silica sol having a silica concentration of 60% by mass as measured after storage at 50° C. for 14 days is 1.0 to 30 times the viscosity of only a dispersion medium used in the silica sol as measured at 25° C.

7. The silica sol according to claim 1, wherein a dispersion medium of the silica sol is an organic solvent having a carbonyl structure, an ether structure, or a carbon-carbon bond structure.

8. The silica sol according to claim 1, wherein a dispersion medium of the silica sol is a ketone, an ester, an ether, an amide, or a hydrocarbon.

9. The silica sol according to claim 1, wherein a dispersion medium of the silica sol is methyl ethyl ketone, methyl isobutyl ketone, diisopropyl ketone, diisobutyl ketone, cyclohexanone, ethyl acetate, butyl acetate, propylene glycol monomethyl ether, or propylene glycol monomethyl ether acetate.

10. The silica sol according to claim 1, wherein a dispersion medium of the silica sol is a polymerizable monomer having a polymerizable group.

11. The silica sol according to claim 10, wherein the polymerizable group of the polymerizable monomer is a (meth)acryloyl group, an epoxy group, an organic group containing an epoxy group, or a nitrogen-atom-containing organic group containing an epoxy group.

12. The silica sol according to claim 3, wherein the silane compound coating the silica particles and a dispersion medium of the silica sol have a combination of functional groups copolymerizable with each other.

13. The silica sol according to claim 1, wherein the basic substance is selected from an amine, ammonia, an inorganic alkaline compound, or a quaternary ammonium compound.

14. A production method for the silica sol according to claim 1, the method comprising the following step (A):

step (A): a step of mixing a silica sol A containing silica particles A having an average particle diameter of 35 nm or more and 200 nm or less with a silica sol B containing silica particles B having an average particle diameter of 5 nm or more and less than 35 nm so that the mass ratio of the silica particles A: the silica particles B is 99:1 to 60:40.

15. The production method for the silica sol according to claim 14, wherein the silica sol A and the silica sol B in the step (A) contain a same dispersion medium or dispersion media compatible with each other, and the dispersion medium is water, a $C_{1-4}$ alcohol, an organic solvent having a carbonyl structure, an ether structure, or a carbon-carbon bond structure, or a polymerizable monomer having a polymerizable group.

16. The production method for the silica sol according to claim 14, wherein, in the step (A), a dispersion medium of the silica sol A and the silica sol B is changed from water to a $C_{1-4}$ alcohol, and then the dispersion medium is changed to an organic solvent having a carbonyl structure, an ether structure, or a carbon-carbon bond structure, or to a polymerizable monomer having a polymerizable group.

17. The production method for the silica sol according to claim 14, wherein when a dispersion medium of the silica sol A and the silica sol B is a $C_{1-4}$ alcohol in the step (A), the method comprises a step of coating the silica particles of the silica sol A and/or the silica sol B with at least one silane compound selected from the group consisting of silane compounds of the following Formulae (1) to (3):

Formula (1)

Formula (2)

Formula (3)

(in Formula (1), $R^1$ is a group bonded to the silicon atom via an Si—C bond and is each an alkyl group, a halogenated alkyl group, an alkenyl group, an aryl group, or an organic group containing an epoxy group, a (meth)acryloyl group, a mercapto group, an amino group, a ureido group, or a cyano group;

$R^2$ is a group or atom bonded to the silicon atom and is each an alkoxy group, an acyloxy group, or a halogen atom; and a is an integer of 1 to 3, and in Formulae (2) and (3), each of $R^3$ and $R^5$ is a group bonded to the silicon atom via an Si—C bond and is a $C_{1-3}$ alkyl group or a $C_{6-30}$ aryl group;

each of $R^4$ and Re is a group or atom bonded to the silicon atom and is an alkoxy group, an acyloxy group, or a halogen atom;

Y is a group or atom bonded to the silicon atom and is an alkylene group, an NH group, or an oxygen atom;

b is an integer of 1 to 3; c is an integer of 0 or 1; and d is an integer of 1 to 3).

18. The production method for the silica sol according to claim 14, wherein when a dispersion medium of the silica sol A and the silica sol B is a $C_{1-4}$ alcohol in the step (A), the method comprises a step of adding a basic substance.

19. The silica sol according to claim 1, wherein a mass ratio of silica particles A present in the range of the peak a to silica particles B present in the range of the peak b is in a range of 99:1 to 60:40.

20. The silica sol according to claim 13, wherein the basic substance is added in such an amount that the pH of the silica sol is adjusted to a range of 7.0 to 10.0.

\* \* \* \* \*